United States Patent [19]
Farinacci et al.

[11] Patent Number: 6,078,590
[45] Date of Patent: Jun. 20, 2000

[54] HIERARCHICAL ROUTING KNOWLEDGE FOR MULTICAST PACKET ROUTING

[75] Inventors: Dino Farinacci, San Jose, Calif.; Yakov Rekhter, New Rochelle, N.Y.

[73] Assignee: Cisco Technology, Inc., San Jose, Calif.

[21] Appl. No.: 08/897,215

[22] Filed: Jul. 14, 1997

[51] Int. Cl.[7] .................................................. H04L 4/00
[52] U.S. Cl. .................................... 370/432; 370/400
[58] Field of Search .................................. 370/400, 389, 370/351, 390, 408, 432, 396

[56] References Cited

U.S. PATENT DOCUMENTS

| | | |
|---|---|---|
| Re. 33,900 | 4/1992 | Howson . |
| 4,131,767 | 12/1978 | Weinstein . |
| 4,161,719 | 7/1979 | Parikh et al. . |
| 4,316,284 | 2/1982 | Howson . |
| 4,397,020 | 8/1983 | Howson . |
| 4,419,728 | 12/1983 | Larson . |
| 4,424,565 | 1/1984 | Larson . |
| 4,437,087 | 3/1984 | Petr . |
| 4,438,511 | 3/1984 | Baran . |
| 4,439,763 | 3/1984 | Limb . |
| 4,445,213 | 4/1984 | Baugh et al. . |
| 4,446,555 | 5/1984 | Devault et al. . |
| 4,456,957 | 6/1984 | Schieltz . |
| 4,464,658 | 8/1984 | Thelen . |
| 4,499,576 | 2/1985 | Fraser . |

(List continued on next page.)

FOREIGN PATENT DOCUMENTS

| | | |
|---|---|---|
| 0 384 758 A2 | 8/1990 | European Pat. Off. . |
| 0 431 751 A1 | 6/1991 | European Pat. Off. . |
| 0 567 217 A2 | 10/1993 | European Pat. Off. . |
| WO93/07569 | 4/1993 | WIPO . |
| WO93/07692 | 4/1993 | WIPO . |
| WO94/01828 | 1/1994 | WIPO . |
| WO95/20850 | 8/1995 | WIPO . |

OTHER PUBLICATIONS

William Stallings, Data and Computer Communications, pp. 329–333, Prentice Hall, Upper Saddle River, New Jersey 07458.

Allen, M., "Novell IPX Over Various WAN Media (IPXWAN)," Network Working Group, RFC 1551, Dec. 1993, pp. 1–22.

(List continued on next page.)

Primary Examiner—Hassan Kizou
Assistant Examiner—Daniel Previl
Attorney, Agent, or Firm—Swernofsky Law Group

[57] ABSTRACT

The invention provides a method and system for multicast packet routing, in which only selected routers in a network subset (in a preferred embodiment, those routers on the border of the domain) maintain routing information external to the network subset, while all other routers in the network subset (non-border routers) maintain only information regarding routing within the network subset, including which border routers are on the path from the multicast source device or to the destination devices. The network subset is preferably a domain or other routing domain. A multicast distribution tree is maintained, using protocol messages which are transmitted from leaf nodes toward a root of the tree, while data packets to be multicast are distributed from the root toward the leaf nodes. In each network subset, such as a routing domain, each multicast packet is associated with a multicast distribution tree. The multicast distribution tree is associated with an upstream border router (UBR) and a set of downstream border routers (DBRs). The UBR and DBRs maintain complete routing information for each multicast source device, while all other routers in the network subset maintain routing information only to the UBR and DBRs. A "JOIN" or "PRUNE" protocol message associates a particular UBR with a particular multicast source device, so that non-border routers within the network subset only have to maintain routing information to border routers, while still being able to correctly maintain a multicast distribution tree rooted at a node outside the network subset.

9 Claims, 1 Drawing Sheet

U.S. PATENT DOCUMENTS

| | | |
|---|---|---|
| 4,506,358 | 3/1985 | Montgomery . |
| 4,507,760 | 3/1985 | Fraser . |
| 4,532,626 | 7/1985 | Flores et al. . |
| 4,644,532 | 2/1987 | George et al . |
| 4,646,287 | 2/1987 | Larson et al. . |
| 4,677,423 | 6/1987 | Benvenuto et al. . |
| 4,679,189 | 7/1987 | Olson et al. ............................... 370/60 |
| 4,679,227 | 7/1987 | Hughes-Hartogs . |
| 4,723,267 | 2/1988 | Jones et al. . |
| 4,731,816 | 3/1988 | Hughes-Hartogs . |
| 4,750,136 | 6/1988 | Arpin et al. . |
| 4,757,495 | 7/1988 | Decker et al. . |
| 4,763,191 | 8/1988 | Gordon et al. . |
| 4,769,810 | 9/1988 | Eckberg, Jr. et al. . |
| 4,769,811 | 9/1988 | Eckberg, Jr. et al. . |
| 4,771,425 | 9/1988 | Baran et al. . |
| 4,819,228 | 4/1989 | Baran et al. . |
| 4,827,411 | 5/1989 | Arrowood et al. . |
| 4,833,706 | 5/1989 | Hughes-Hartogs . |
| 4,835,737 | 5/1989 | Herrig et al. . |
| 4,879,551 | 11/1989 | Georgiou et al. . |
| 4,893,306 | 1/1990 | Chao et al. . |
| 4,903,261 | 2/1990 | Baran et al. . |
| 4,922,486 | 5/1990 | Lidinsky et al. . |
| 4,933,937 | 6/1990 | Konishi . |
| 4,960,310 | 10/1990 | Cushing . |
| 4,962,497 | 10/1990 | Ferenc et al. . |
| 4,962,532 | 10/1990 | Kasirai et al. . |
| 4,965,772 | 10/1990 | Daniel et al. . |
| 4,970,678 | 11/1990 | Sladowski et al. . |
| 4,979,118 | 12/1990 | Kheradpir ............................... 364/436 |
| 4,980,897 | 12/1990 | Decker et al. . |
| 4,991,169 | 2/1991 | Davis et al. . |
| 5,003,595 | 3/1991 | Collins et al. . |
| 5,014,265 | 5/1991 | Hahne et al. . |
| 5,020,058 | 5/1991 | Holden et al. . |
| 5,033,076 | 7/1991 | Jones et al. . |
| 5,054,034 | 10/1991 | Hughes-Hartogs . |
| 5,059,925 | 10/1991 | Weisbloom . |
| 5,072,449 | 12/1991 | Enns et al. . |
| 5,088,032 | 2/1992 | Bosack . |
| 5,095,480 | 3/1992 | Fenner ................................... 370/94.1 |
| 5,115,431 | 5/1992 | Williams et al. . |
| 5,128,945 | 7/1992 | Enns et al. . |
| 5,136,580 | 8/1992 | Videlock et al. . |
| 5,166,930 | 11/1992 | Braff et al. . |
| 5,199,049 | 3/1993 | Wilson . |
| 5,206,886 | 4/1993 | Bingham . |
| 5,208,811 | 5/1993 | Kashio et al. . |
| 5,212,686 | 5/1993 | Joy et al. . |
| 5,224,099 | 6/1993 | Corbalis et al. . |
| 5,226,120 | 7/1993 | Brown et al. . |
| 5,228,062 | 7/1993 | Bingham . |
| 5,229,994 | 7/1993 | Balzano et al. . |
| 5,237,564 | 8/1993 | Lespagnol et al. . |
| 5,241,682 | 8/1993 | Bryant et al. . |
| 5,243,342 | 9/1993 | Kattemalalavadi et al. . |
| 5,243,596 | 9/1993 | Port et al. . |
| 5,247,516 | 9/1993 | Bernstein et al. . |
| 5,249,178 | 9/1993 | Kurano et al. . |
| 5,253,251 | 10/1993 | Aramaki . |
| 5,255,291 | 10/1993 | Holden et al. . |
| 5,260,933 | 11/1993 | Rouse . |
| 5,260,978 | 11/1993 | Fleischer et al. . |
| 5,268,592 | 12/1993 | Bellamy et al. . |
| 5,268,900 | 12/1993 | Hluchyj et al. . |
| 5,271,004 | 12/1993 | Proctor et al. . |
| 5,274,631 | 12/1993 | Bhardwaj . |
| 5,274,635 | 12/1993 | Rahman et al. . |
| 5,274,643 | 12/1993 | Fisk . |
| 5,280,470 | 1/1994 | Buhrke et al. . |
| 5,280,480 | 1/1994 | Pitt et al. . |
| 5,280,500 | 1/1994 | Mazzola et al. . |
| 5,283,783 | 2/1994 | Nguyen et al. . |
| 5,287,103 | 2/1994 | Kasprzyk et al. . |
| 5,287,453 | 2/1994 | Roberts ................................... 395/200 |
| 5,291,482 | 3/1994 | McHarg et al. . |
| 5,305,311 | 4/1994 | Lyles . |
| 5,307,343 | 4/1994 | Bostica et al. . |
| 5,309,437 | 5/1994 | Perlman et al. ...................... 730/85.13 |
| 5,311,509 | 5/1994 | Heddes et al. . |
| 5,313,454 | 5/1994 | Bustini et al. . |
| 5,313,582 | 5/1994 | Hendel et al. . |
| 5,317,562 | 5/1994 | Nardin et al. . |
| 5,319,644 | 6/1994 | Liang . |
| 5,327,421 | 7/1994 | Hiller et al. . |
| 5,331,637 | 7/1994 | Francis et al. .......................... 370/408 |
| 5,345,445 | 9/1994 | Hiller et al. . |
| 5,345,446 | 9/1994 | Hiller et al. . |
| 5,359,592 | 10/1994 | Corbalis et al. . |
| 5,361,250 | 11/1994 | Nguyen et al. . |
| 5,361,256 | 11/1994 | Doeringer et al. ....................... 370/401 |
| 5,361,259 | 11/1994 | Hunt et al. . |
| 5,365,524 | 11/1994 | Hiller et al. . |
| 5,367,517 | 11/1994 | Cidon et al. . |
| 5,371,852 | 12/1994 | Attabasio et al. . |
| 5,386,567 | 1/1995 | Lien et al. . |
| 5,390,170 | 2/1995 | Sawant et al. . |
| 5,390,175 | 2/1995 | Hiller et al. . |
| 5,394,394 | 2/1995 | Crowther et al. . |
| 5,394,402 | 2/1995 | Ross . |
| 5,400,325 | 3/1995 | Chatwani et al. . |
| 5,408,469 | 4/1995 | Opher et al. . |
| 5,416,842 | 5/1995 | Aziz . |
| 5,422,880 | 6/1995 | Heitkamp et al. . |
| 5,422,882 | 6/1995 | Hiller et al. . |
| 5,423,002 | 6/1995 | Hart . |
| 5,426,636 | 6/1995 | Hiller et al. . |
| 5,428,607 | 6/1995 | Hiller et al. . |
| 5,430,715 | 7/1995 | Corbalis et al. . |
| 5,430,729 | 7/1995 | Rahnema . |
| 5,442,457 | 8/1995 | Najafi . |
| 5,442,630 | 8/1995 | Gagliardi et al. . |
| 5,452,297 | 9/1995 | Hiller et al. . |
| 5,473,599 | 12/1995 | Li et al. . |
| 5,473,607 | 12/1995 | Hausman et al. . |
| 5,477,541 | 12/1995 | White et al. . |
| 5,485,455 | 1/1996 | Dobbins et al. . |
| 5,490,140 | 2/1996 | Abensour et al. . |
| 5,490,258 | 2/1996 | Fenner ................................... 395/401 |
| 5,491,687 | 2/1996 | Christensen et al. . |
| 5,491,804 | 2/1996 | Heath et al. . |
| 5,497,368 | 3/1996 | Reijnierse et al. ....................... 370/406 |
| 5,504,747 | 4/1996 | Sweazey ................................. 370/403 |
| 5,509,006 | 4/1996 | Wilford et al. . |
| 5,517,494 | 5/1996 | Green ...................................... 370/408 |
| 5,519,704 | 5/1996 | Farinacci et al. . |
| 5,519,858 | 5/1996 | Walton et al. .......................... 395/600 |
| 5,526,489 | 6/1996 | Nilakantan et al. . |
| 5,530,963 | 6/1996 | Moore et al. . |
| 5,535,195 | 7/1996 | Lee . |
| 5,539,734 | 7/1996 | Burwell et al. . |
| 5,541,911 | 7/1996 | Nilakantan et al. . |
| 5,546,370 | 8/1996 | Ishikawa . |
| 5,555,244 | 9/1996 | Gupta et al. . |
| 5,561,669 | 10/1996 | Lenney et al. . |
| 5,583,862 | 12/1996 | Callon . |
| 5,592,470 | 1/1997 | Rudrapatna et al. . |
| 5,598,581 | 1/1997 | Daines et al. . |
| 5,600,798 | 2/1997 | Chenrukui et al. . |
| 5,604,868 | 2/1997 | Komine et al. . |
| 5,608,726 | 3/1997 | Virgile ................................... 370/401 |

| | | |
|---|---|---|
| 5,617,417 | 4/1997 | Sathe et al. . |
| 5,617,421 | 4/1997 | Chin et al. . |
| 5,630,125 | 5/1997 | Zellweger .................................. 395/614 |
| 5,631,908 | 5/1997 | Saxe . |
| 5,632,021 | 5/1997 | Jennings et al. . |
| 5,634,010 | 5/1997 | Ciscon et al. . |
| 5,638,359 | 6/1997 | Peltola et al. . |
| 5,644,718 | 7/1997 | Belove et al. . |
| 5,659,684 | 8/1997 | Giovannoni et al. . |
| 5,666,353 | 9/1997 | Klausmeier et al. . |
| 5,673,265 | 9/1997 | Gupta et al. . |
| 5,678,006 | 10/1997 | Valizadeh et la. . |
| 5,680,116 | 10/1997 | Hashimoto et al. . |
| 5,684,797 | 11/1997 | Azner et al. . |
| 5,687,324 | 11/1997 | Green et al. . |
| 5,689,506 | 11/1997 | Chiussi et al. . |
| 5,694,390 | 12/1997 | Yamato et al. . |
| 5,724,351 | 3/1998 | Chao et al. . |
| 5,748,186 | 5/1998 | Raman ........................................ 345/302 |
| 5,748,617 | 5/1998 | McLain, Jr. . |
| 5,754,547 | 5/1998 | Nakazawa . |
| 5,802,054 | 9/1998 | Bellenger . |
| 5,835,710 | 11/1998 | Nagami et al. . |
| 5,854,903 | 12/1998 | Morrison et al. . |
| 5,856,981 | 1/1999 | Voelker . |
| 5,892,924 | 4/1999 | Lyon et al. .......................... 395/200.75 |
| 5,898,686 | 4/1999 | Virgile . |
| 5,903,559 | 5/1999 | Acharya et al. . |

OTHER PUBLICATIONS

Becker, D., "3c589.c: A 3c589 Etherlink3 ethernet driver for linux," becker@CESDIS.gsfc.nasa.gov, May 3, 1994, pp. 1–13.

Chowdhury, et al., "Alternative Bandwidth Allocation Algorithms for Packet Video in ATM Networks," INFOCOM 1992, pp. 1061–1068.

Doeringer, W., "Routing on Longest–Matching Prefixes," IEEE/ACM Transactions in Networking, vol. 4, No. 1, Feb. 1996, pp. 86–97.

Esaki, et al., "Datagram Delivery in an ATM–Internet," 2334b IEICE Transactions on Communcations, Mar. 1994, No. 3, Tokyo, Japan.

IBM Corporation, "Method and Apparatus for the Statistical Multiplexing of Voice, Data and Image Signals," IBM Technical Disclosure Bulletin, No. 6, Nov. 1992, pp. 409–411.

Pei, et al., "Putting Routing Tables in Silicon," IEEE Network Magazine, Jan. 1992, pp. 42–50.

Perkins, D., "Requirements for an Internet Standard Point–to–Point Protocol," Network Working Group, RFC 1547, Dec. 1993, pp. 1–19.

Simpson, W., "The Point–to –Point Protocol (PPP)," Network Working Group, RFC 1548, Dec. 1993, pp. 1–53.

Tsuchiya, P.F., "A Search Algorithm for Tabe Entries with Non–Contiguous Wildcarding," Abstract, Bellcore.

Zhang, et al., "Rate–Controlled Static–Priority Queueing," INFOCOM 1993, pp. 227–236.

HIERARCHICAL ROUTING KNOWLEDGE FOR MULTICAST PACKET ROUTING

BACKGROUND OF THE INVENTION

1. Field of the Invention

The invention relates to routing multicast packets.

2. Related Art

In a network of networks, sometimes called an "internet" (alternatively, an "intranet"), routers are typically separated into a set of routing domains (alternatively, "autonomous routing groups" or "domains"). Routers in each routing domain maintain information about destinations and associated "next hops" to those destinations; the routers are able to maintain such information by exchanging routing protocol messages.

Such networks can include systems for transmitting packets which are unicast (directed to a single destination device) or multicast (directed to multiple destination devices). When packets are multicast, they are transmitted using a multicast distribution tree. Accordingly, when a router forwards a multicast packet, the router must maintain routing information about its communication interface to the next hop toward the root of the multicast distribution tree, and for all successive next hops leading to the multiple destination devices.

One problem which has arisen in the art is that a large amount of information must therefore be recorded for routing multicast packets; this problem is made worse with increasing size of the internet.

Accordingly, it would be desirable to provide a method and system for routing multicast packets in an internet, in which not all routers in a routing domain would be required to maintain complete routing information for roots of multicast trees, if those roots are external to the routing domain. This advantage is achieved in an embodiment of the invention in which only selected routers in a routing domain maintain routing information about those roots which are external to the routing domain, while all other routers in the routing domain maintain only routing information about those roots which are internal to the routing domain.

SUMMARY OF INVENTION

The invention provides a method and system for multicast packet routing, in which only selected routers in a network subset (in a preferred embodiment, those routers on the border of the network subset) maintain routing information about roots of multicast trees for roots which are external to the network subset, while all other routers in the network subset (non-border routers) maintain only information regarding routing within the network subset, including routing to border routers of the network subset, but not including routing to roots which are external to the network subset. The network subset is preferably a routing domain or other autonomous routing group.

In a preferred embodiment, a multicast distribution tree is maintained, using protocol messages which are transmitted from leaf nodes toward a root of the tree, while data packets to be multicast are distributed from the root toward the leaf nodes. In each network subset, such as a routing domain or other autonomous system, each multicast packet is associated with a multicast distribution tree. A subtree of the multicast distribution tree within a single routing domain is associated with an upstream border router (UBR) and a set of downstream border routers (DBRs). A "JOIN" or "PRUNE" protocol message includes information which associates a particular UBR with a root of a particular multicast tree. The UBR and DBRs maintain complete routing information for each root of a multicast tree, while all other routers in the network subset (non-border routers) maintain routing information only to destinations within the network subset, including the UBR and DBRs.

DETAILED DESCRIPTION OF THE PREFERRED EMBODIMENT

Figure 1:
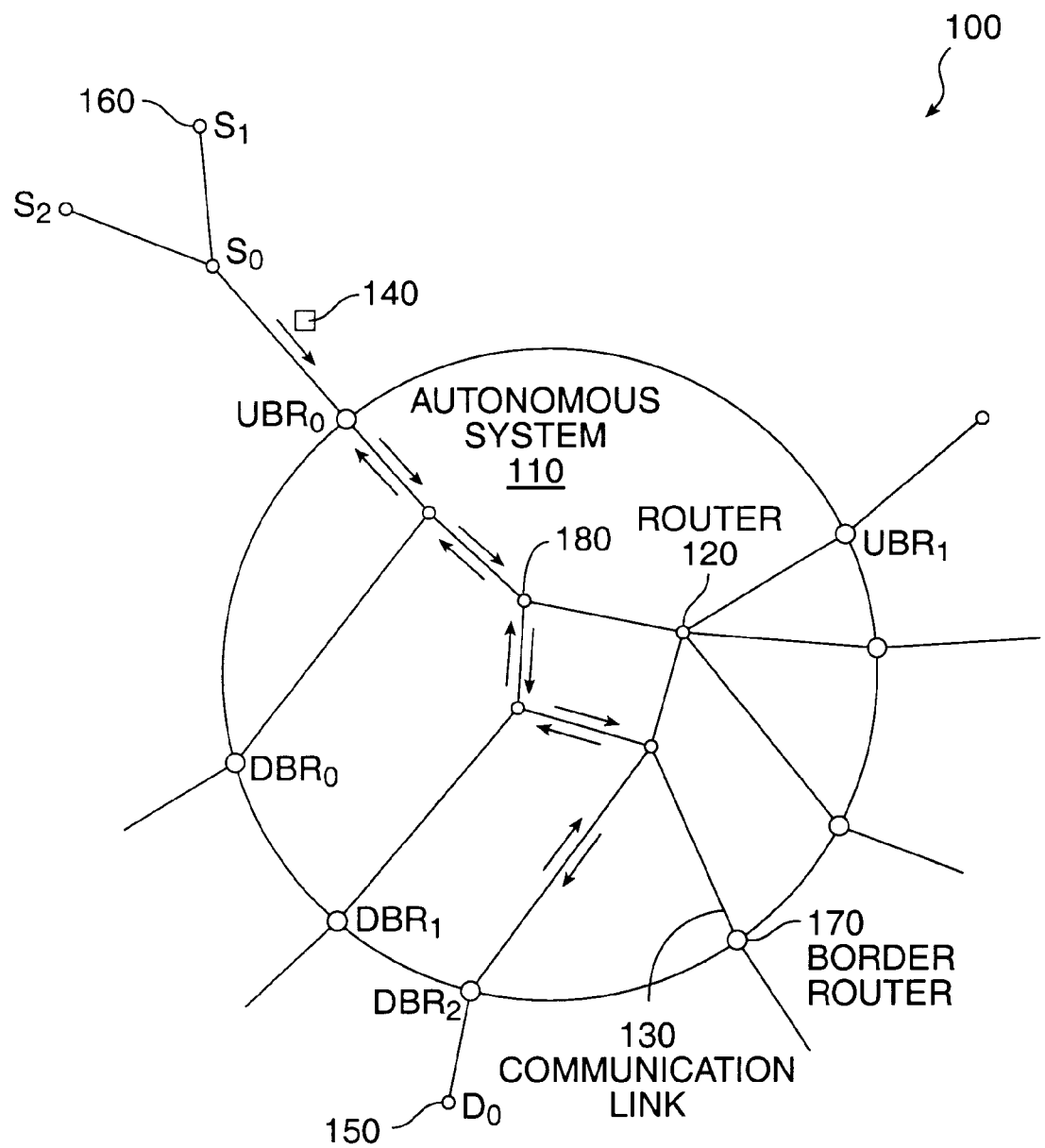
FIG. 1 shows a block diagram of a routing domain embedded in a network.

In the following description, a preferred embodiment of the invention is described with regard to preferred process steps and data structures. Those skilled in the art would recognize after perusal of this application that embodiments of the invention can be implemented using general purpose processors or special purpose processors adapted to particular process steps and data structures described herein, and that implementation of the process steps and data structures described herein would not require undue experimentation or further invention.

Routing Domain Within A Network

FIG. 1 shows a block diagram of a routing domain within a network.

In a network of networks 100, a network subset 110 includes a set of routers 120 internal to the network subset 110. Messages routed within the network subset 110 are routed by those routers 120 internal to the network subset 110.

In a preferred embodiment, the network subset 110 comprises a routing domain, but in alternative embodiments, the network subset 110 may comprise any other autonomous routing group, such as a set of routers which are topologically close, which share common administrative control, or which otherwise form a defined subset of the network 100.

The routers 120 include a set of border routers 170; all other routers 120 are non-border routers 180. Border routers 170 are those which are considered on the border of the network subset 110, as generally defined by having a routing peer relationship with both a router 120 within the network subset 110, as well as with a router 120 outside the network subset 110. Non-border routers 120 are all other routers 120 in the network subset 110.

Pairs of routers 120 are coupled by communication links 130, each of which is capable of transmitting packets 140 from one router 120 to another router 120. Packets 140 can include user data or protocol information, or both.

Each router 120 maintains routing information about the network 100, including information for routing unicast packets 140 (packets 140 which are specified for a single destination device 150) and information for routing multicast packets 140 (packets 140 which are specified for multiple destination devices 150).

Routing Multicast Packets

For multicast packets 140, additional information is maintained. A multicast distribution tree comprises a set of routers 120 which distribute the multicast packets 140 from a selected multicast source device 160 to a plurality of destination devices 150. As used herein with regard to routing multicast packets, the phrase "multicast source device" refers to any device which acts as the root of a multicast tree. The routers 120 maintain information regarding (a) the outbound communication links 130 in the multicast distribution tree, but also (b) the inbound communication link 130 the router 120 expects the multicast packet 140 to arrive from. The latter information allows the router 120 to discard multicast packets 140 which were misrouted, such as in a loop.

Where a multicast packet 140 is routed downward along the multicast distribution tree to one or more destination devices 150 outside the network subset 110, the one or more border routers 170 of the network subset 110 which route the packet 140 outside the network subset 110 are classed as downstream border routers ("DBR") 170. A downstream border router 170 thus receives multicast packets 140 destined for particular destination devices 150 outside the network subset 110 and distributes those multicast packets 140 downstream in the multicast distribution tree to those particular destination devices 150 in a part of the multicast distribution tree which is outside the network subset 110.

Where a multicast packet 140 is routed along the multicast distribution tree from a multicast source device 160 outside the network subset 110, the border router 170 of the network subset 110 which routes the packet 140 from outside the network subset 110 is classed as an upstream border router ("UBR") 170. An upstream border router 170 thus receives multicast packets 140 from a particular multicast source device 160 outside the network subset 110 and distributes those multicast packets 140 downstream in the multicast distribution tree. Part of the multicast distribution tree is within the network subset 110.

Each router 120 thus maintains routing information including entries for those multicast source devices 160 for which multicast packets must be forwarded. Where the multicast source device 160 is outside the network subset 110, this information includes (a) for border routers 170, routing information regarding the multicast source device 160 and all successive next hop devices, or (b) for non-border routers 180, routing information for only the border router 170 which is expected to route the packet 140 from the multicast source device 160.

Multicast Packet Protocol Messages

In a preferred embodiment, the multicast distribution tree is created and modified by control messages in a Sparse Mode PIM multicast routing protocol. In alternative embodiments, other protocols, such as CBT, could be used instead or in addition. A "JOIN" protocol message is used to add a non-border router 180 or a border router 170 to the multicast distribution tree. A "PRUNE" protocol message is used to remove a non-border router 180 or a border router 170 from the multicast distribution tree.

Both JOIN and PRUNE protocol messages are transmitted from a first router 120 at a leaf of the multicast distribution tree to a sequence of routers 120 in the multicast distribution tree; which may traverse through a border router 170 in the direction of transmission toward the root of the multicast distribution tree. Once the multicast distribution tree includes a set of routers 120, information about the multicast distribution tree at each router 120 is sufficient to forward multicast packets 140 to those routers 120 in the multicast distribution tree, and therefore to those destination devices 150 for which the multicast packets 140 are destined.

Within the network subset 110, JOIN and PRUNE protocol messages each include information which designate the UBR 170 on a path to the multicast source device 160. Thus, non-border routers 180 within the network subset 110 maintain routing information only about the UBR 170 for the multicast distribution tree for the network subset 110, but need not maintain routing information about the multicast source device 160.

Outside the network subset 110, JOIN and PRUNE protocol messages each designate the multicast source device 160 explicitly. Thus border routers 170 within the network subset 110, and all routers 120 outside the network subset 110, maintain routing information about the actual multicast source device 160 for the multicast distribution tree. Of course, some routers 120 outside the network subset 110 may be within a second network subset 110, and can therefore maintain routing information only about the UBR 170 for the multicast distribution tree for the second network subset 110.

When a DBR 170 receives a JOIN or PRUNE protocol message for a particular multicast distribution tree, and the DBR 170 determines that its upstream neighbor router 180 for that multicast distribution tree is a non-border router 120, the DBR 170 uses the routing information from other border routers 170 within the network subset 110 to find an address (in a preferred embodiment, the IP address) of the UBR 170 for that multicast distribution tree, includes the address of the associated UBR 170 in a JOIN or PRUNE protocol message, and sends that JOIN or PRUNE protocol message to its upstream neighbor router 120.

When a DBR 170 which is part of a particular multicast distribution tree determines (such as from routing information received from other border routers 170 within the network subset 110) that the UBR 170 for that multicast distribution tree has changed, the DBR 170 removes itself using a PRUNE protocol message from the multicast distribution tree associated with the old UBR 170, and adds itself using a JOIN protocol message to the multicast distribution tree associated with the new UBR 170.

If the DBR 170 determines that its upstream neighbor router 120 towards the new UBR 170 is different from its upstream neighbor towards the old UBR 170, then the DBR 170 sends a JOIN protocol message to its upstream neighbor router 120 towards the new UBR 170, and sends a PRUNE protocol message to its upstream neighbor router 120 towards the old UBR 170. However, if the DBR 170 determines that its upstream neighbor router 120 towards the new UBR 170 is the same as its upstream neighbor router 120 towards the old UBR 170, the DBR 170 constructs a combined protocol message including both JOIN and PRUNE components; a PRUNE component includes the address of the old UBR 170, while a JOIN component includes the address of the new UBR 170.

When a non-border router 180 receives a combined protocol message including both JOIN and PRUNE components, the non-border router 180 follows a similar procedure. However, when selecting an upstream neighbor router 120 for its own JOIN or PRUNE protocol message, the non-border router 180 uses the address of the UBR 170 included in the received combined protocol message rather than the address of the multicast source device 160. The non-border router 180 copies the UBR 170 information from the received combined protocol message into a new combined protocol message for sending upstream towards the multicast source device 160.

If the combined protocol message received by the non-border router 180 contains both JOIN and PRUNE components for the same multicast distribution tree, the non-border router 180 does not remove the sending router 120 from the multicast distribution tree specified by the PRUNE component of the combined protocol message.

If the message contains both JOIN and PRUNE components for the same multicast distribution tree, the non-border router 180 determines whether its upstream neighbor router 120 towards a first UBR 170 in the PRUNE component is different from its upstream neighbor router towards a second UBR 170 in the JOIN component of the combined protocol message. If the first UBR 170 and the second UBR 170 are different, the non-border router 180 sends a PRUNE protocol message to its upstream neighbor router 120 towards the UBR 170 in the PRUNE component, and sends a JOIN protocol message to its upstream neighbor router 120 towards the UBR 170 in the JOIN component of the combined protocol message. However, if the first UBR 170 and the second UBR 170 are identical, the non-border router 180 transmits the combined protocol message with both JOIN and PRUNE components unchanged to that upstream neighbor router 120.

When a border router 170 receives a combined protocol message including both JOIN and PRUNE components, and the UBR 170 information included in the combined protocol message identifies that same border router 170, the border router 170 follows a similar procedure, but when sending its own combined protocol message, the border router 170 sends that combined protocol message without any UBR 170 information.

Because multicast packets 140 are transmitted using the multicast distribution tree, and because the multicast distribution tree is maintained using hierarchical routing knowledge (within the network subset 110, knowledge about multicast source devices 160 in the network subset 110, and only outside or on the border of the network subset 110, knowledge about multicast source devices 160 outside the network subset 110), it is possible to distribute multicast packets 140 using hierarchical routing knowledge without encapsulation. Once the multicast distribution tree is constructed, as described herein, any one of the routers 120 can select multicast packets 140 that should be forwarded using that multicast distribution tree without requiring the router 120 to maintain routing information for the root of that multicast distribution tree.

Alternative Embodiments

Although preferred embodiments are disclosed herein, many variations are possible which remain within the concept, scope, and spirit of the invention, and these variations would become clear to those skilled in the art after perusal of this application.

What is claimed is:

1. A method of routing multicast packets in a network, including the steps of defining a subset of said network;

defining a set of border routers within said subset;

for said border routers, maintaining a first set of unicast routing information for routing multicast packets from devices external to said subset; and for routers within said subset other than said border routers, maintaining a second set of unicast routing information for routing multicast packets only from devices within said subset.

2. A method as in claim 1, wherein said subset comprises a component of a routing hierarchy, a network domain, a routing domain, or an autonomous routing group.

3. A method as in claim 1, wherein said second set of unicast routing information includes identification of an upstream border router for each multicast source device outside said subset.

4. A method of maintaining a multicast distribution tree in a subset of a network, including the steps of associating each multicast packet with a multicast source device and a set of destination devices;

associating said multicast source device with an upstream border router within the subset;

associating said destination devices with a corresponding set of downstream border routers within the subset;

transmitting multicast data packets from said multicast source device to said destination devices, by routing those multicast data packets from said multicast source device to said upstream border router;

transmitting multicast data packets from said multicast source device to said destination devices, by routing those multicast data packets within the subset from the upstream border router to the downstream border routers; and transmitting multicast data packets from said multicast source device to said destination devices, by routing those multicast data packets from said downstream border routers to the destination devices.

5. A method as in claim 4, wherein said subset comprises a network domain, a routing domain, or an autonomous routing group.

6. A method as in claim 4, wherein each said multicast packet is transmitted from said multicast source device to said destination device without encapsulation.

7. A method of routing multicast packets in a network, including the steps of defining a subset of said network;

defining a set of border routers within said subset;

for routing multicast packets from a multicast source device external to the subset, maintaining for a border router a first set of unitcast routing information regarding the multicast source device; and for routing multicast packets from a multicast source device external to the subset, maintaining for a non-border router a second set of unicast routing information regarding only a border router within the subset which is expected to route the multicast packet to the non-border router.

8. A method as in claim 7, wherein said subset comprises a component of a routing hierarchy, a network domain, a routing domain, or an autonomous routing group.

9. A method as in claim 7, wherein said second set of unicast routing information includes identification of an upstream border router for each multicast source device outside said subset.

* * * * *